(12) United States Patent
Kawaguchi et al.

(10) Patent No.: US 7,862,472 B2
(45) Date of Patent: Jan. 4, 2011

(54) AUTOMATIC TRANSMISSION

(75) Inventors: Takateru Kawaguchi, Shizouoka (JP); Satoshi Ozawa, Machida (JP); Fumitaka Nagashima, Fuji (JP); Shinya Mochiyama, Fuji (JP)

(73) Assignee: JATCO Ltd, Fuji-shi (JP)

( * ) Notice: Subject to any disclaimer, the term of this patent is extended or adjusted under 35 U.S.C. 154(b) by 534 days.

(21) Appl. No.: 11/946,483

(22) Filed: Nov. 28, 2007

(65) Prior Publication Data

US 2008/0153655 A1     Jun. 26, 2008

(30) Foreign Application Priority Data

Dec. 20, 2006  (JP)  ............... 2006-342597

(51) Int. Cl.
*F16H 59/60* (2006.01)
*F16H 3/44* (2006.01)
*G06F 19/00* (2006.01)

(52) U.S. Cl. .................. 477/97; 477/906; 70/63; 475/281

(58) Field of Classification Search ............... 477/97, 477/143, 906; 701/62, 63; 475/280, 281, 475/284, 288, 289, 285
See application file for complete search history.

(56) References Cited

U.S. PATENT DOCUMENTS

| | | | |
|---|---|---|---|
| 4,785,689 A | 11/1988 | Iwatsuki et al. | |
| 4,843,551 A | 6/1989 | Milunas | |
| 5,016,174 A | 5/1991 | Ito et al. | |
| 5,033,328 A | 7/1991 | Shimanaka | |
| 5,060,540 A | 10/1991 | Yamaguchi | |
| 5,113,725 A | 5/1992 | Tomomatsu et al. | |
| 5,233,890 A | 8/1993 | Aldrich, III et al. | |
| 5,439,427 A | 8/1995 | Enokido et al. | |
| 5,846,162 A | 12/1998 | Ito et al. | |
| 5,855,532 A | 1/1999 | Sugiyama | |

(Continued)

FOREIGN PATENT DOCUMENTS

DE    100 38 144 A1    4/2001

(Continued)

OTHER PUBLICATIONS

T. Kawaguchi, U.S. PTO Office Action, U.S. Appl. No. 11/962,469, dated Jul. 6, 2010, 14 pages.

(Continued)

*Primary Examiner*—Roger Pang
(74) *Attorney, Agent, or Firm*—Foley & Lardner LLP

(57) ABSTRACT

In a planetary gear type stepped automatic transmission, a gear shift control to shift a gear shift stage between a first gear shift stage and a second gear shift stage is performed by a first shift control section by referring to a first gear shift control data used when the gear shift stage is switched between the first gear shift stage and the second gear shift stage, an abnormality state due to a failure of at least one of a first frictional engaging element and a second frictional engaging element is detected, and an abnormality state gear shift control is performed to shift the gear shift stage between a third gear shift stage (for example, first speed) and a fourth gear shift stage (for example, 2.5 speed) by the first shift control section, while forcefully releasing the first frictional engaging element, when detecting the abnormality state.

14 Claims, 8 Drawing Sheets

U.S. PATENT DOCUMENTS

| | | | |
|---|---|---|---|
| 5,957,800 A | 9/1999 | Oba et al. | |
| 6,270,439 B1 | 8/2001 | Suzuki | |
| 6,309,324 B1 | 10/2001 | Sawa et al. | |
| 6,319,164 B1 | 11/2001 | Runde et al. | |
| 6,357,289 B1 | 3/2002 | Futawatari | |
| 6,440,040 B1 | 8/2002 | Amano et al. | |
| 6,520,881 B1 | 2/2003 | Long et al. | |
| 7,006,907 B2 | 2/2006 | Usuki et al. | |
| 7,044,886 B2 | 5/2006 | Watanabe et al. | |
| 7,128,683 B2 | 10/2006 | Oguri et al. | |
| 7,140,993 B2 | 11/2006 | Long et al. | |
| 7,255,663 B2 | 8/2007 | Kawamoto et al. | |
| 7,402,123 B2* | 7/2008 | Kobayashi et al. | 477/75 |
| 7,419,452 B2* | 9/2008 | Nozaki et al. | 475/123 |
| 7,682,275 B2 | 3/2010 | Yoneyama | |
| 2006/0040791 A1 | 2/2006 | Nakajima et al. | |
| 2007/0015624 A1 | 1/2007 | Ota et al. | |
| 2007/0078042 A1 | 4/2007 | Yoneyama | |
| 2008/0064568 A1 | 3/2008 | Kawaguchi et al. | |
| 2008/0113848 A1 | 5/2008 | Inoue et al. | |
| 2008/0167155 A1 | 7/2008 | Kawaguchi et al. | |
| 2008/0176706 A1* | 7/2008 | Wu et al. | 477/5 |

FOREIGN PATENT DOCUMENTS

| | | | |
|---|---|---|---|
| JP | 1-172660 A | 7/1989 | |
| JP | 2-304262 A | 12/1990 | |
| JP | 3-113161 A | 5/1991 | |
| JP | 04-015359 A | 1/1992 | |
| JP | 05-288264 A | 11/1993 | |
| JP | 5-346160 A | 12/1993 | |
| JP | 6-109129 A | 4/1994 | |
| JP | 8-219274 A | 8/1996 | |
| JP | 09-317871 A | 12/1997 | |
| JP | 11-280896 A | 10/1999 | |
| JP | 11-280898 A | 10/1999 | |
| JP | 2000-240785 A | 9/2000 | |
| JP | 2003-097691 A | 4/2003 | |
| JP | 2005-155719 A | 6/2005 | |
| JP | 2007-120757 A | 5/2007 | |

OTHER PUBLICATIONS

English translation of JP 06-109129 previously submitted in an IDS dated Apr. 14, 2009, 14 pages.
U.S. Appl. No. 11/962,469, filed Dec. 21, 2007, Kawaguchi et al.
U.S. Appl. No. 12/029,632, filed Feb. 12, 2008, Kawaguchi et al.
U.S. Appl. No. 11/853,181, filed Sep. 11, 2007, Kawaguchi.
T. Lawaguchi, U.S. PTO Office Action, U.S. Appl. No. 12/029,632, dated Sep. 1, 2010, 13 pages.

* cited by examiner

FIG.2

| | B1<br>Fr/B | C1<br>I/C | C2<br>D/C | C3<br>H&LR/C | B2<br>LOW/B | B3<br>2346/B | B4<br>R/B | F1 | F2 |
|---|---|---|---|---|---|---|---|---|---|
| 1st | (○) | | | (○) | ○ | | | ○ | ○ |
| 2nd | | | | (○) | ○ | ○ | | | ○ |
| 3rd | | | ○ | | ○ | ○ | | | |
| 4th | | | ○ | ○ | | ○ | | | |
| 5th | | ○ | ○ | ○ | | | | | |
| 6th | | ○ | | ○ | | ○ | | | |
| 7th | ○ | ○ | | ○ | | | | ○ | |
| Rev. | ○ | | | ○ | | | ○ | | |

FIG.6

| | FR/B B1 | I/C C1 | D/C C2 | H&LR/C C3 | LOW/B B2 | 2346/B B3 | R/B B4 |
|---|---|---|---|---|---|---|---|
| 1 | (●) | | | (●) | ● | | |
| 2 | | | | (●) | ● | ● | |
| 2.5 | (●) | | ● | ● | | | |
| 4 | | | ● | ● | | ● | |

FORCEFUL RELEASE

AUTOMATIC TRANSMISSION

BACKGROUND OF THE INVENTION (1) Background of the Invention

The present invention relates to a technique on a fail-safe control when a failure of any one or more of frictional engaging elements in a multiple-speed (or planetary gear type stepped) automatic transmission.

(2) Description of Related Art

A Japanese Patent Application Publication (tokkai) 2005-155719 published on Jun. 16, 2005 (which corresponds to a U.S. Pat. No. 7,128,683 issued on Oct. 31, 2006) exemplifies a previously proposed multiple-speed (or planetary gear type stepped) automatic transmission which is equipped with four couples of planetary gears and seven couples of frictional engaging elements and which is capable of switching gear shift stages of forward seven speeds (forward seven gear ratios) and one reverse speed (one reverse gear ratio).

SUMMARY OF THE INVENTION

If any one of the frictional engaging elements which is in a clutched state at a second speed, a third speed, a fourth speed, and a sixth speed has failed to be disabled to be clutched (or has failed to be clutched), such a control at a time of such an abnormality as described above can be thought that a gear shift stage only of a first speed, a fifth speed, and a seventh speed at which it is not necessary for the failed frictional engaging element is used to make a vehicle in which this automatic transmission is equipped run. However, since a difference in the gear shift stages between the first speed and the fifth speed is large, a traveling performance (or called, a driveability) can remarkably be worsened.

Then, since a special gear shift stage not used in a normal operation state is set between the first speed and the fifth speed and is used during an abnormal state. In this case, it can be considered that the traveling performance can be improved if the special gear shift stage is used when the abnormality described above occurs.

However, since control data for the special gear shift is accordingly increased, the data capacity is needed to be accordingly increased. Especially, in the automatic transmission whose number of gear shaft stages are increased, a control date on the gear shift stages used in the normal operation state is large. Thus, an increase in the data capacity due to the addition of the control data in the case where the abnormality occurs becomes a major problem.

It is an object of the present invention to provide a multiple-speed (or planetary gear type stepped) automatic transmission in which an increase in the date capacity is suppressed while an intermediate gear shift stage which is not used in the normal operation state is usable during the failure in one of the frictional elements.

According to one aspect of the present invention, there is provided an automatic transmission, comprising: a plurality of planetary gears; a plurality of frictional engaging elements connected to rotational elements of the respective planetary gears, the automatic transmission achieving a plurality of gear shift stages based on a traveling state of a vehicle by changing clutched and released states of the respective frictional engaging elements and the plurality of gear shift stages including a third gear shift stage achieved by releasing a first frictional engaging element, the first frictional engaging element being clutched at a first gear shift stage and at a second gear shift stage, and excluding a fourth gear shift stage achieved by releasing the first frictional engaging element clutched at the second gear shift stage; a first shift control section configured to perform a gear shift control to shift the gear shift stage between the first gear shift stage and the second gear shift stage by referring to a first gear shift control data used when the gear shift stage is switched between the first gear shift stage and the second gear shift stage; an abnormality state detecting section configured to detect an abnormality state in which both of the first gear shift stage and the second gear shift stage are unachieved due to a failure of at least one of the first frictional engaging element and a second frictional engaging element which is released at both of the first gear shift stage and the second gear shift stage; and an abnormality state gear shift control section configured to perform the gear shift control to shift the gear shift stage between the third gear shift stage and the fourth gear shift stage through the first gear shift control section, while forcefully releasing the first frictional engaging element, when the abnormality state detecting section detects the abnormality state.

According to another aspect of the present invention, there is provided a control method applicable to an automatic transmission, the automatic transmission comprising: a plurality of planetary gears; and a plurality of frictional engaging elements connected to rotational elements of the respective planetary gears, the automatic transmission achieving a plurality of gear shift stages based on a traveling state of a vehicle by changing clutched and released states of the respective frictional engaging elements and the plurality of gear shift stages including a third gear shift stage achieved by releasing a first frictional engaging element, the first frictional engaging element being clutched at a first gear shift stage and at a second gear shift stage, and excluding a fourth gear shift stage achieved by releasing the first frictional engaging element clutched at the second gear shift stage, the control method comprising: performing a gear shift control to shift the gear shift stage between the first gear shift stage and the second gear shift stage by referring to a first gear shift control data used when the gear shift stage is switched between the first gear shift stage and the second gear shift stage; detecting an abnormality state in which both of the first gear shift stage and the second gear shift stage are unachieved due to a failure of at least one of the first frictional engaging element and a second frictional engaging element which is released at both of the first gear shift stage and the second gear shift stage; and performing the gear shift control to shift the gear shift stage between the third gear shift stage and the fourth gear shift stage by performing the gear shift control to shift the gear shift stage between the first gear shift stage and the second gear shift stage, while forcefully releasing the first frictional engaging element, when detecting the abnormality state.

Since, according to the present invention, the gear shift stage can be switched to the fourth gear shift stage excluded from the gear shift stages based on the traveling state of the vehicle during the failure in the first frictional engaging element or in the second frictional engaging element, a worsening of a traveling (driving) performance can be prevented. In addition, since the first gear shift control data can be used during the change in the gear shift stage between the first gear shift stage and the second gear shift stage when the gear shift from the third gear shift stage to the fourth gear shift stage is performed, no new gear shift control data used for the occurrence of failure is needed to be prepared and the increase in data capacity can accordingly be suppressed. This summary of the invention does not necessarily describe all necessary features so that the invention may also be a sub-combination of these described features. The other objects and features of this invention will become understood from the following description with reference to the accompanying drawings.

BRIEF DESCRIPTION OF THE DRAWINGS

FIG. 2 is a clutch table representing clutched states of respective frictional engaging elements for respective gear shift stages in the automatic transmission shown in FIG. 1.

FIG. 6 is an engagement table representing the clutched state of the respective engaging elements at a forward first speed, at a forward second speed, at a forward 2.5 speed, and at a forward fourth speed.

DETAILED DESCRIPTION OF THE INVENTION

Reference will hereinafter be made to the drawings in order to facilitate a better understanding of the present invention.

First Embodiment

Figure 1:
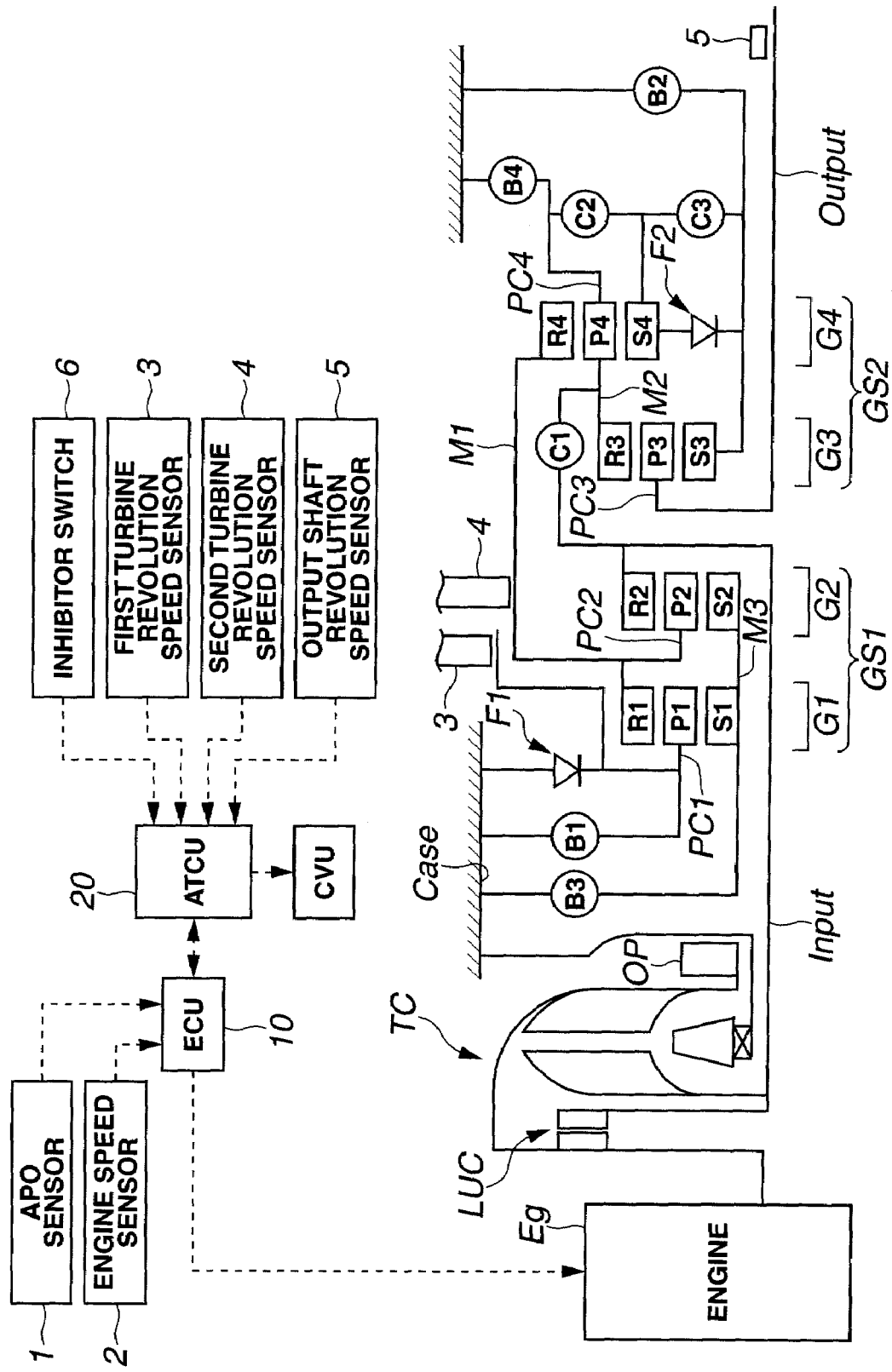
FIG. 1 is a skeleton view representing a structure of a multiple-speed (or planetary gear type stepped) automatic transmission to which an automatic transmission in a first preferred embodiment according to the present invention is applicable.

FIG. 1 shows a skeleton diagram representing a construction of a multiple-speed (or planetary gear type stepped) automatic transmission to which an automatic transmission in a first preferred embodiment according to the present invention is applicable. The automatic transmission in this embodiment is a multiple-speed (multiple gear ratios) planetary gear type stepped) automatic transmission configured to establish forward seven speeds (gear ratios) and one reverse speed (gear ratio). A driving force of an engine Eg is inputted to an input shaft Input via a torque converter TC having a lock-up clutch LUC and a revolution speed of engine Eg is subjected to a gear shift (or a gear ratio shift) by means of four planetary gears and seven frictional engaging elements (as will be described later) and is outputted via an output shaft Output. In addition, an oil pump OP is provided coaxially on a pump impeller of torque converter TC and is drivingly rotated according to the driving force of engine Eg to pressurize oil. That is to say, the revolution outputted from engine Eg rotatively drives the pump impeller and an oil pump OP of torque converter TC. Oil stirred due to the rotation of the oil impeller is transmitted to a turbine runner via a stator of torque converter TC to drive input shaft Input.

An engine controller (ECU (Engine Control Unit)) 10 configured to control a driving state of engine Eg, an automatic transmission controller (ATCU) 20 configured to control a state of transmission of the automatic transmission, and a control valve unit (CVU) 30 configured to control a hydraulic pressure for each of the frictional engaging elements on the basis of an output signal from ATCU 20. It should be noted that ECU 10 and ATCU 20 are connected to each other via a CAN (Computer Area Network) communication line, sharing sensor information and control information by signal communication lines.

APO sensor 1 configured to detect a quantity of a driver's operation (also called, an operating variable) on an accelerator pedal and engine speed sensor 2 configured to detect a rotation speed of engine Eg (engine speed) are connected to ECU 10. ECU 10 controls a fuel injection quantity and a throttle opening angle of an engine throttle valve on the basis of the engine speed and the quantity of the driver's operation on the accelerator pedal and controls the revolution speed and torque of the engine.

A first turbine revolution speed sensor 3 configured to detect a revolution speed of a first carrier PC1 (as will be described later), a second turbine revolution speed sensor 4 configured to detect a revolution speed of a first ring carrier R1 (as will be described later), and an inhibitor switch 6 configured to detect an operation state of a shift lever by the driver are connected to ATCU 20. The shift lever has an engine braking position acting an engine braking and an ordinary forward running range position not acting the engine braking in addition to P, R, N, and D range. ATCU 20 selects an optimal command gear shift stage from a gear shift map on the basis of a vehicle speed Vsp (which corresponds to a signal outputted from an output shaft revolution speed sensor 5) and the quantity of the driver's operation on the accelerator pedal, viz., and outputs a control command to achieve the commanded gear shift stage to control valve unit (CVU) 30. That is to say, ATCU 20 has a gear shift control section which outputs a control command to achieve the commanded gear shift stage to control valve unit (CVU).

Next, a gear shift mechanism configure to transmit the revolution of input shaft Input to output shaft Output while the revolution of input shaft being subjected to the gear ratio shift will be described below. The gear shift mechanism includes: a first planetary gear set GS1 and a second planetary gear set GS2 in an order from input shaft Input toward axial output shaft Output. A plurality of clutches C1, C2, C3, and a plurality of brakes B1, B2, B3, and B4 are disposed in the gear shift mechanism as frictional engaging elements. Furthermore, a plurality of one-way clutches F1 and F2 are disposed in the gear shift mechanism.

First planetary gear G1 is a single pinion planetary gear having a first sun gear S1, a first ring gear R1, and a first (planetary-pinion) carrier PC1 supporting a first pinion P1 meshed with both gears S1 and R1. Second planetary gear G2 is a single pinion planetary gear having a second ring gear R2, a second ring gear R2, and a second (planetary-pinion) carrier PC2 supporting a second pinion P2 in mesh with both gears S2 and R2. Third planetary gear G3 is a single pinion type planetary gear having a third gear S3, a third ring gear R3, and a third carrier PC3 supporting a third pinion P3 in mesh with both gears S3 and R3. Fourth planetary gear G4 is a single pinion type planetary gear having a fourth sun gear S4, a fourth ring gear R4, and a fourth pinion carrier PC4 supporting a fourth pinion P4 in mesh with both gears S4 and R4.

An input shaft Input is coupled with second ring gear R2 and receives the rotation driving force from engine Eg via torque converter TC and so forth. An output shaft Output is coupled with third carrier PC3 in order for an input rotation driving force to be transmitted to driving wheels via final gears or so forth.

A first connection member M1 is a member configured to integrally link with first ring gear R1, second carrier PC2, and fourth ring gear R4. A second connection member M2 is a member configured to integrally link third ring gear R3 and fourth carrier PC4. A third connection member M3 is a member configured to integrally link first sun gear S1 and second sun gear S2.

First planetary gear set GS1 is constituted by four rotational elements and configured to link first planetary gear G1 to second planetary gear G2 through first connection member M1 and third connection member M3. In addition, second planetary gear set GS2 is constituted by five rotational elements and configured to link third planetary gear G3 and fourth planetary gear G4 via second connection member M2.

An input clutch (I/C) C1 is a clutch which selectively connects and disconnects input shaft Input to and from second connection member M2. A direct clutch (D/C) C2 is a clutch which selectively connect and disconnects fourth sun gear S4 to and from fourth carrier PC4.

An H&LR clutch (H&LR/C) C1 is a clutch which selectively connects and disconnects third sun gear S3 to and from fourth sun gear S4. In addition, a second one-way clutch F2 is interposed between third sun gear S3 and fourth sun gear S4. This one-way clutch F2 releases H&LR clutch C3. When a rotation speed of fourth sun gear S4 is larger (faster) than that of third sun gear S3, third planetary gear G3 develops the rotation speed independently of fourth sun gear S4. Thus, third planetary gear G3 is connected to fourth planetary gear G4 via second connection member M2 and their respective planetary gears achieve an independent gear ratio.

A front brake B1 (Fr/B, second frictional engaging element) is a brake which selectively stops the revolution of first carrier PC1. First one-way clutch F1 is disposed in parallel to front brake B1. A low brake (LOW/B) B2 is a brake which selectively stops the rotation of third sun gear S3. A 2346-brake b3 (2346/B, a first frictional engaging element) is a brake which selectively stops the rotation of third connection member M3 linking first sun gear S1 and second sun gear S2. A reverse brake (R/B) B4 is a brake which selectively stops the rotation of fourth carrier PC4. ATCU 20 calculates a revolution speed of input shaft using the output signals of the first and second turbine sensors 3 and 4 since input shaft Input is linked to second ring gear R2. That is to say, N(R2)=(1+β) N(PC2)−(1/β)·N(PC1), wherein a gear ratio between second ring gear R2 and second carrier PC2 is 1 and β denotes a gear ratio between first ring gear R2 and first carrier PC1, N(R2) denotes the rotation speed of the second ring gear R2, viz., input shaft Input, N(PC2) denotes the rotation speed of second carrier PC2, and N(PC1) denotes the rotation speed of first carrier PC1.

Figure 3:
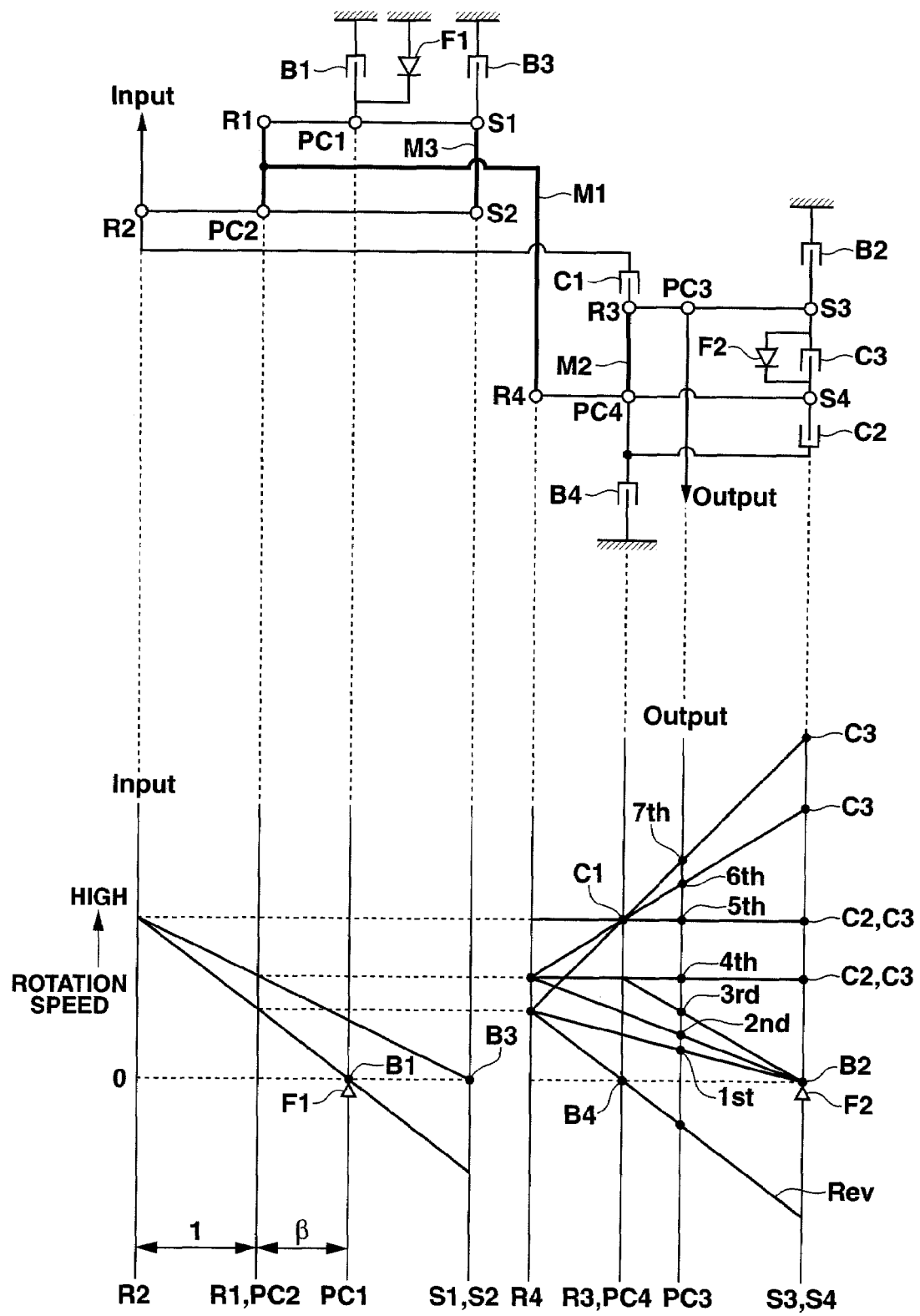
FIG. 3 is a lever diagram representing a rotational state of respective rotational members of planetary gears at the respective gear shift stages of the automatic transmission shown in FIG. 1.

Next, referring to FIGS. 2 and 3, the operation of the gear shift mechanism will be described below. FIG. 2 shows an engagement table representing an engagement state of each engaging element for each of gear ratio speed ranges. In FIG. 2, a circle mark of O represents that the corresponding engaging element is in the clutched state and another circle mark of (O) represents that the corresponding engaging element is in the engaged state when a range position at which an engine braking is acted is selected. FIG. 3 shows a lever diagram representing a revolution state of each rotational member at the respective gear shift stages.

At a first speed (a third gear shift stage), only low brake B2 is clutched. First, one-way clutch F1 and second one-way clutch F2 are engaged. In addition, when the engine braking is acted, front brake B1 and H&LR clutch C3 are furthermore clutched.

If first one-way clutch F1 is engaged, the rotation of first carrier PC1 is stopped. Hence, the rotation inputted from Input shaft Input to second ring gear R2 is speed-reduced by first planetary gear set GS1, this rotation is outputted from first connection member M1 to fourth ring gear R4. In addition, low brake B2 is engaged and second one-way clutch F2 is engaged and second one-way clutch F2 is engaged so that the rotations of third sun gear S3 and fourth sun gear S4 are stopped. Hence, the revolution inputted to fourth ring gear R4 is speed-reduced by second planetary gear set GS2 and is outputted from third carrier PC3.

That is to say, as shown in the lever diagram of FIG. 3, the rotation of input shaft is speed-reduced by means of first planetary gear set GS1, is speed-reduced by second planetary gear set GS2, and is outputted from third carrier PC3. In details, the first speed, as shown in the lever diagram of FIG. 3, is prescribed by a line connecting a clutching point of front brake B1 which speed-reduces the output revolution of engine Eg to a clutching point of low brake B2 which speed-reduces the speed-reduced rotation of first planetary gear set GS1 and the rotation inputted from input shaft Input is speed-reduced and is outputted from output shaft Output.

At a second speed (a first gear shift stage), low brake B2 and 2346-brake B3 are engaged and second one-way clutch F2 is engaged. In addition, during the operation of the engine brake, H&LR clutch C3 is furthermore engaged.

If 2346-brake B3 is engaged, the rotations of first sun gear S1 and second sun gear S2 are stopped. Hence, the rotation inputted from input shaft Input to second ring gear R2 is speed-reduced only by means of second planetary gear G2. This rotation is outputted from first connection member M1 to fourth ring gear R4. In addition, low brake B2 is engaged and second one-way clutch F2 is engaged. Thus, the rotations of third sun gear S3 and fourth sun gear S4 are stopped. Hence, the rotation inputted to fourth sun gear R4 is speed-reduced through second planetary gear set GS2 and is outputted from third carrier PC3.

That is to say, as shown in the lever diagram of FIG. 3, the rotation of input shaft Input is speed-reduced by first planetary gear set GS1, is speed-reduced by second planetary gear set GS2 and, thereafter, is outputted from output shaft Output. The second speed is prescribed by a line connecting a clutching point of 2346-brake B3 which speed reduces the output revolution of engine Eg and a clutching point of low brake B2 which speed reduces the speed-reduced rotation from second planetary gear G2, as shown in the lever diagram in FIG. 3 and the rotation inputted from input shaft Input is speed-reduced and is outputted form output shaft Output.

At a third speed, low brake B2, 2346-brake B3, and direct clutch C2 are clutched.

Since 2346-brake B3 is engaged, the rotations of first sun gear S1 and second sun gear S2 are stopped. Hence, the rotation inputted from input shaft Input to second ring gear R2 is speed-reduced through second planetary gear G2 and this rotation is outputted from first connection member M1 to fourth ring gear R4. In addition, the engagement of direct clutch C2 causes the rotation thereof together with fourth planetary gear G4. Hence, fourth planetary gear G4 participates in the torque transmission but does not participate in a speed reduction action. Furthermore, the engagement of low brake B2 causes the rotation of third sun gear S3 to be stopped. Hence, the rotation inputted to third ring gear R3 via second connection member M2 from fourth carrier PC4 which integrally rotates with fourth ring gear R4 is speed-reduced through third planetary gear G3 and is outputted from third carrier PC3.

That is to say, as shown in the lever diagram of FIG. 3, the rotation of input shaft Input is speed-reduced through first planetary gear set GS1, is speed-reduced through first planetary gear G3 of second planetary gear set GS2, and is outputted from output shaft Output. The fourth speed is prescribed by a line connecting the clutching point of 2346-brake B3 and the clutching point of low brake B2 which speed reduces of the speed reduced rotation of second planetary gear G2, as shown in the lever diagram of FIG. 3.

At a fourth speed (a second gear shift stage), 2346-brake B3, direct clutch C2, and H&LR clutch C3 are clutched.

The clutching of 2346-brake B3 causes rotations of first sun gear S1 and second sun gear S2 to be stopped. The rotation inputted from input shaft Input to second ring gear R2 is speed-reduced only through second planetary gear G2. This speed-reduced gear ratio is outputted from first connection member M1 to fourth ring gear R4. In addition, direct clutch C2 and H&LR clutch C3 are clutched (engaged) to be rotated in a unit with second planetary gear set GS2. Hence, the rotation inputted to fourth ring gear R4 is directly outputted from third carrier PC3.

That is to say, as shown in the lever diagram of FIG. 3, the rotation of input shaft Input is speed-reduced through first planetary gear set GS1 and is outputted from output shaft Output without speed reduction at second planetary gear set GS2. The fourth speed is prescribed by a line connecting the clutching point of 2346-brake B3 which speed reduces the output rotation of engine Eg to the clutching points of direct clutch C2 and H&LR clutch C3 which directly output the speed-reduced rotation from second planetary gear G2.

At a fifth speed (5th), input clutch C1, direct clutch C2, and H&LR clutch C3 are clutched.

The clutching of input clutch C1 causes the rotation of input shaft Input to be directly inputted to second connection member M2. In addition, the clutching of direct clutch C2 and H&LR clutch C3 causes second planetary gear set GS2 to be integrally rotated. Hence, the rotation of input shaft Input is directly outputted from third carrier PC3.

That is to say, as shown in the lever diagram of FIG. 3, the rotation of input shaft Input is speed-reduced through first planetary gear set GS1 and is directly outputted from output shaft Output without the speed reduction at secondary planetary gear set GS2. The fifth speed is prescribed by a line connecting the clutching points of input clutch C1, direct clutch C2, and H&LR clutch C3 and the rotation input from input shaft Input is directly outputted from output shaft Out.

At a sixth speed (6th), input clutch C1, H&LR clutch C3, and 2346-brake B3 are clutched.

Since input clutch C1 is clutched, the rotation of input shaft Input is inputted to second ring gear and is directly inputted to second ring gear R2 and is directly inputted to second connection member M2. In addition, since 2346-brake B3 is clutched, rotations of first sun gear S1 and second sun gear S2 are stopped. Hence, the rotation of input shaft Input is speed-reduced through second planetary gear G2 and is outputted from first connection member M1 to fourth ring gear R4.

Furthermore, since H&LR clutch C3 is clutched, third sun gear S3 and fourth sun gear S4 are integrally rotated. Thus, second planetary gear set GR2 outputs the rotation prescribed according to the rotation of fourth ring gear R4 and the rotation of second connection member M2 from third carrier PC3.

That is to say, as shown in the lever diagram of FIG. 3, part of the rotation of input shaft input is speed-reduced at first planetary gear set GS1 but is speed-increased at second planetary gear set GS2, and is outputted from output shaft output. The sixth speed is prescribed by a line connecting the clutching point of 2346-brake B3 which speed reduces the output rotation of engine Eg, the clutching point of input clutch C1 which transmits the output rotation of engine Eg directly to second connection member M2, and H&LR clutch C3 which constitutes second planetary gear set GS2 and the rotation inputted from input shaft Input is speed-increased and is outputted from output shaft Output.

At a seventh (7-th) speed, input clutch C1, H&L R clutch C3, and front brake B1 are clutched and first one-way clutch F1 is engaged.

Since input clutch C1 is clutched, the rotation of input shaft Input is inputted to second ring gear R2 and is directly inputted to second connection member M2. Since front brake B1 is clutched, the rotation of first carrier PC1 is stopped. Hence, the rotation of input shaft Input is speed-reduced at first planetary gear set GS1 and this rotation is outputted from first connection member M1 to fourth ring gear R4.

In addition, since H&LR clutch C3 is clutched, third sun gear S3 is rotated in a unit with (integrally rotated together with) fourth sun gear S4. Thus, second planetary gear set GS2 outputs the rotation prescribed according to the rotation of fourth ring gear R4 and according to the rotation of second connection member M2 through third carrier PC3.

That is to say, as shown in the lever diagram of FIG. 3, part of rotation of input shaft Input is speed-reduced at first planetary gear set GS1, is speed-increased at second planetary gear set GS2, and is outputted from output shaft output. The seventh speed is prescribed by a line connecting the clutching point of front brake B1 which speed reduces the output rotation of engine Eg through first planetary gear set GS1, the clutching point of input clutch C1 which transmits the output rotation of engine Eg directly to second connection member M2, and the clutching point of H&LR clutch C3 constituting second planetary gear set GS2 and the rotation inputted from input shaft Input is speed-increased and is outputted from output shaft Output.

At a reverse speed (reverse gear shift stage), H&LR clutch C3, front brake B1, and reverse brake B4 are clutched.

Since front brake B1 is clutched, rotation of first carrier PC1 is stopped. Hence, the rotation of input shaft Input is speed-reduced through first planetary gear set GS1 and this speed-reduced rotation is outputted from first connection member M1 to fourth ring gear R4.

In addition, since H&LR clutch C3 is clutched, third sun gear S3 and fourth sun gear S4 are integrally rotated. When reverse brake B4 is clutched, the rotation of second connection member M2 is stopped. Hence, in second planetary gear set GS2, the rotation of fourth ring gear R4 is transmitted to fourth sun gear S4, third carrier PC3, while a reverse rotation is carried out, and is outputted from third carrier PC3.

That is to say, as shown in the lever diagram of FIG. 3, the rotation of input shaft Input is speed-reduced at first planetary gear set GS1, reversed at second planetary gear set GS2, and is outputted from Output shaft output. The reverse speed is prescribed by a line connecting the clutching point of front brake B1 which speed reduces the output rotation of engine Eg through first planetary gear GS1, the clutching point of reverse brake B4 which fixes the rotation of second connection member M2, and the clutching point of H&LR clutch C3 constituting second planetary gear set GS2 and the rotation inputted from input shaft Input is speed-reduced in the reverse direction and is outputted from output shaft Output.

Figure 4:
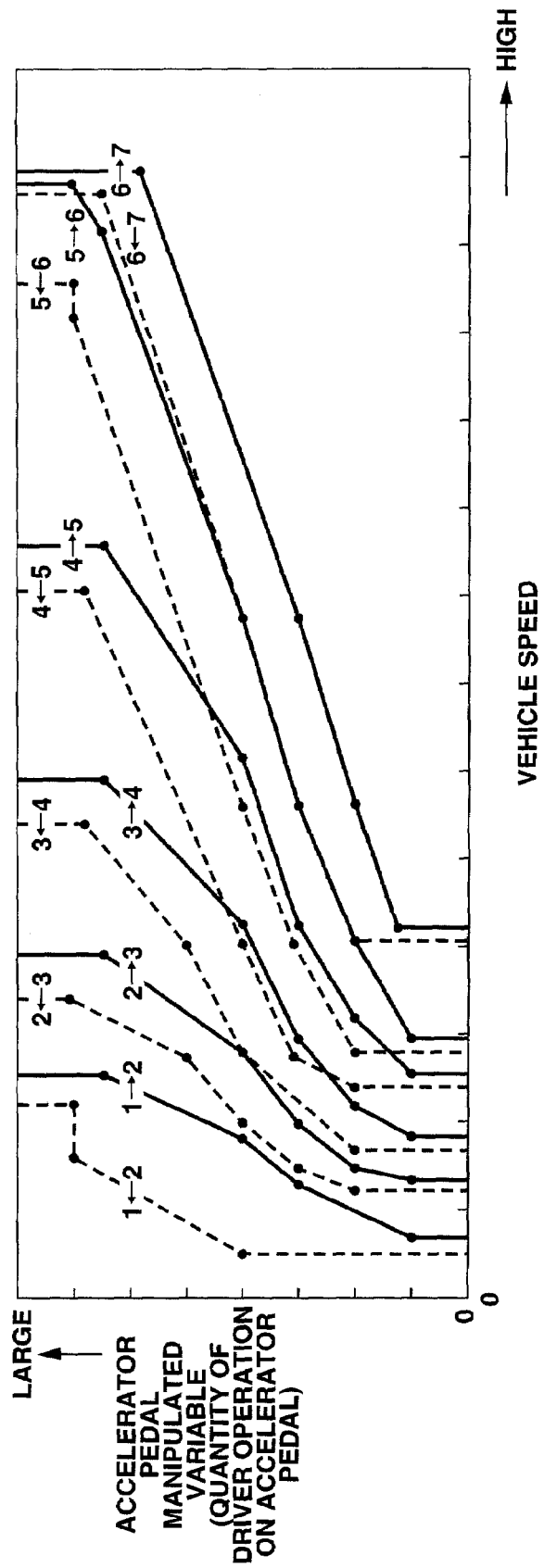
FIG. 4 is a shift diagram representing a relationship between a vehicle speed, an accelerator pedal operating variable (quantity of driver operation on accelerator pedal), and shift line in the automatic transmission shown in FIG. 1.

The automatic transmission is constructed as described above and performs a change in the gear shift stages among first through seventh speeds on the basis of vehicle speed and quantity of driver's operation on the accelerator (pedal) in accordance with a shift schedule (shift lines) shown in FIG. 4. At this time, if any one or more of frictional engaging elements has failed, a desired gear shift stage cannot be achieved and, therefore, the running performance becomes worsened. Therefore, in a case where a failure in the frictional engaging element occurs, a control executed in ATCU 20 will be explained with reference to a flowchart of FIG. 5.

At a step S11 (abnormality state detecting means (section)), ATCU 20 determines whether front brake B1 fails to be released (a front brake clutch failure occurs). If ATCU 20 determines that front brake B1 has failed to be released (or is stuck in the clutched state for the released state to be unachievable, viz., the front brake clutch failure occurs), the routine shown in FIG. 5 goes to a step S12. If no front brake clutch failure occurs (No) at step S11, the processing is ended. The engagement failure (or fails to be released) in front brake B1 is such a failure that front break B1 cannot be released with front brake B1 retained in a clutched state and is developed with an open-and-closure valve which opens or closes a hydraulic pressure supply passage for front brake B1 is stuck in an open state.

The determination of whether front brake B1 fails to be released (the occurrence of the clutch failure in the engagement of front brake B1) is made using a method, for example, disclosed in a Japanese Patent Application Publication No. 2007-120757 published on May 17, 2007. That is to say, if a vehicular deceleration in a non-operation state of a foot brake is larger (or faster) than a predetermined deceleration, ATCU 20 determines an occurrence of an interlock or determines a gear ratio abnormality from a relationship between a command gear ratio (gear shift stage) and an actual gear ratio. When these determinations are made, as a probing control, ATCU 20 detects the actual gear ratio in a state where the commanded gear shift stage is the second (2nd) speed and determines that front brake B1 fails to be clutched in a case where the actual gear ratio is equal to or lower than a gear ratio corresponding to third speed (higher gear ratio side). When front brake B1 has failed to be clutched, front brake B1 is always in the clutched state irrespective of the commanded gear shift stage. Hence, any one or more of the gear shift stages that can normally be gear shifted without occurrence of the interlock are only the first speed, the seventh speed, and the reverse speed as appreciated from FIG. 2. At this time, if the gear ratio (gear shift stage) is shifted from the first (1st) speed to the seventh (7th) speed, a difference in the gear ratio is too large to worsen a driveability remarkably. In addition, it is necessary to prepare gear shift hydraulic pressure data on the gear shift of first speed→seventh speed and a data capacity is accordingly increased.

Figure 5:
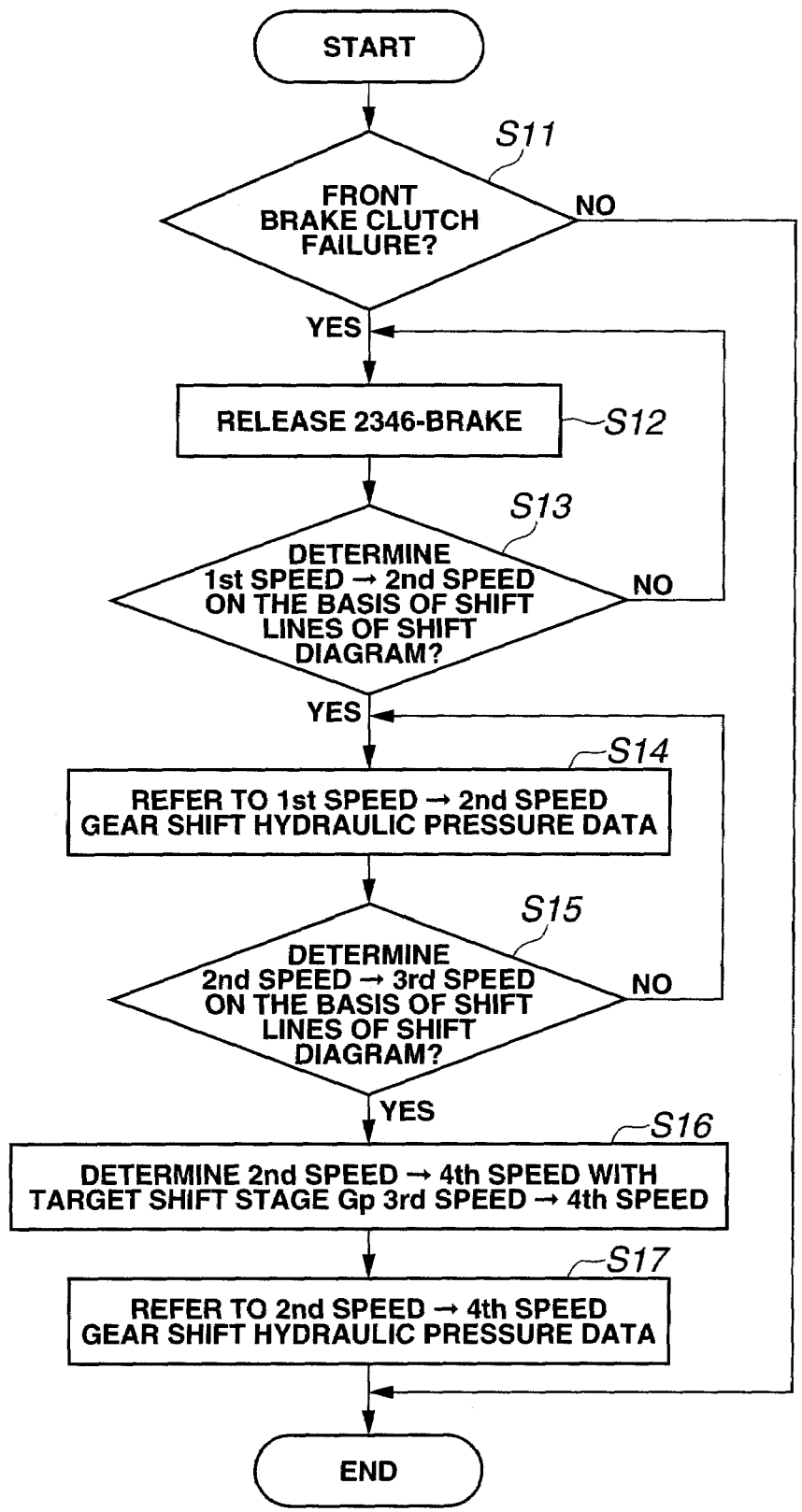
FIG. 5 shows a flowchart representing a fail safe control of the automatic transmission in the first preferred embodiment shown in FIG. 1.

Therefore, in the following steps in FIG. 5, a method for achieving the shift to an intermediate gear shift stage (as will be described later) to be used only in a case where such an abnormality state as described above occurs using an ordinary used gear shift hydraulic pressure data will be described.

At step S12, ATCU 20 executes a forceful release of 2346-brake B3. Ordinarily, at the second speed, 2346-brake B3 is clutched (refer to FIG. 2). However, in a case where front brake B1 fails to be clutched, front brake B1 is left clutched even at the second speed so that the interlock or so forth is developed. Hence, the forceful release of 2346-brake B3 causes the gear shift stage to the first speed. At the next step S13, ATCU 20 determines whether it is necessary to perform the gear shift of the first speed to the second speed.

At the next step S13, ATCU 20 determines whether it is necessary to perform the gear shift of the first speed to the second speed on the basis of shift lines of shift diagram in FIG. 4. If ATCU 20 determines that the gear shift of the first speed to the second speed is needed to be performed (Yes), the routine goes to a step S14. If ATCU 20 determines that no gear shift from the first speed to the second speed is needed to be performed (No), the routine goes to step S12.

At step S14 (second gear shift control means(section)), ATCU 20 performs the gear shift control by referring to the gear shift hydraulic pressure data on the gear shift stage of first speed→second speed. At this time, automatic transmission recognizes that the gear shift control is executed on the basis of the above-described hydraulic pressure data in response to a gear shift command of the first speed→the second speed. However, actually, since 2346-brake B3 is held at the forceful release thereof and front brake B1 is maintained in the clutched state. Hence, the actual gear shift stage is maintained at the first speed.

At a step S15, ATCU 20 determines whether it is necessary to perform the gear shift of the second speed→the third speed on the basis of the gear shift lines of the shift diagram shown in FIG. 4. If ATCU 20 determines that the gear shift from the second speed→the third speed is needed to be performed, the routine goes to a step S16. If ATCU 20 determines that it is not necessary to perform the gear shift from the second speed→the third speed, the routine returns to step S14.

At step S16, ATCU 20 modifies a target gear shift stage Gp from the third speed to the fourth speed and determines that it is necessary to perform the gear shift from the second speed to (→) the fourth speed.

At step S17 (first gear shift control means(section)), ATCU 20 executes a gear shift control by referring to the hydraulic pressure data of the second speed to (→) the fourth speed. At this time, the automatic transmission recognizes that the gear shift control is executed on the basis of the gear shift hydraulic pressure data on the gear shift from the second speed to the fourth speed in response to the gear shift command of the second speed to (→) the fourth speed. However, the actual gear shift stage is transferred from the first speed to a 2.5 speed (this exemplifies the intermediate gear shift stage, viz., a fourth gear shift stage). It should be noted that, in the present specification, the shift stage which takes between the gear ratio corresponding to the second speed and that corresponding to the third speed is described as 2.5 speed for convenience.

Figure 7:
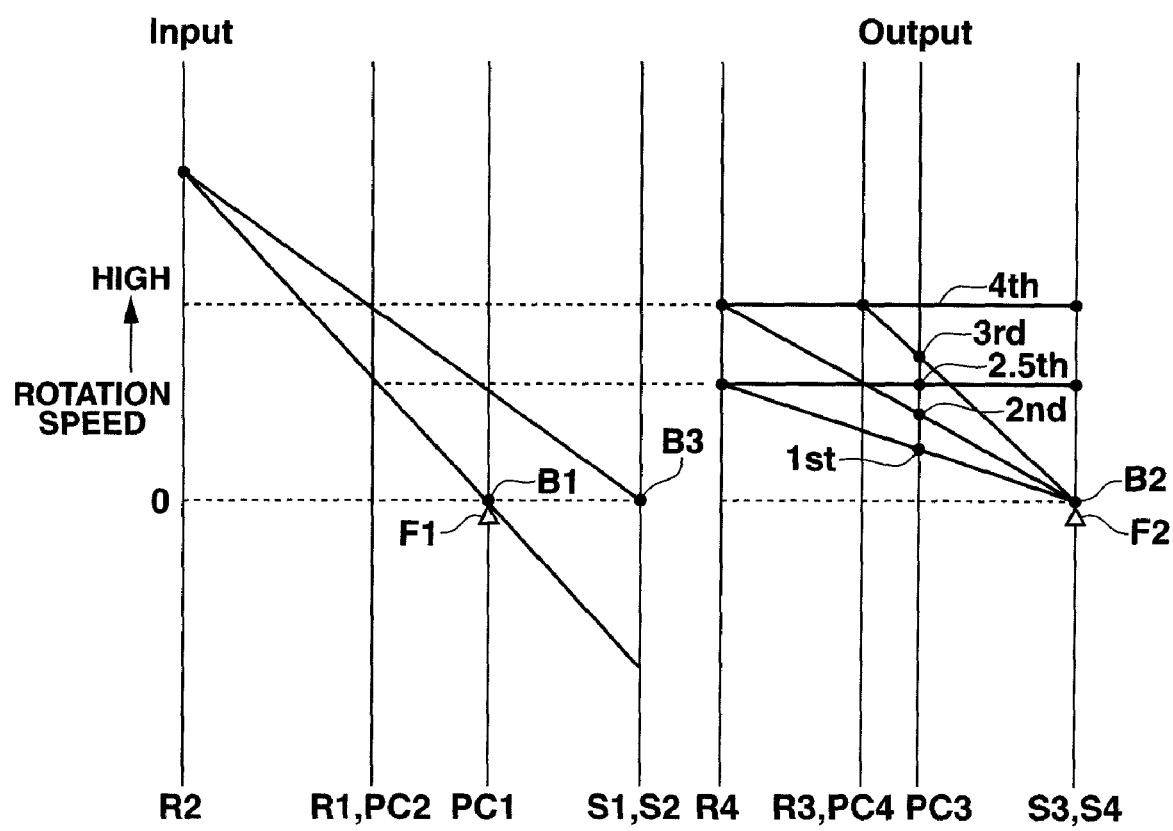
FIG. 7 is a lever diagram representing rotation states of the respective rotational members of the planetary gears at the forward first speed through forward fourth speed.

The gear shift control executed at step S17 will be explained with reference to the clutching table of FIG. 6 and the lever diagram of FIG. 7. FIG. 6 shows the clutching table representing the clutched state of the respective clutching elements at the first speed, at the second speed, at 2.5 speed, and at the fourth speed. In FIG. 7, each black circle denotes the clutched state and each black circle mark with brackets denotes the clutch state with the action of the engine braking. FIG. 7 shows the lever diagram representing rotation states of respective rotating members at the first speed through the fourth speed.

First, the gear shift control from the second speed to the fourth speed during the ordinary state (normal state) will be explained. At the second speed, both of low brake B2 and 2346-brake B3 are clutched. In addition, since second one-way clutch F2 is engaged, approximately the same state in which H&LR clutch C3 is engaged occurs. In addition, at the fourth speed, direct clutch C2, H&LR clutch C3, and 2346-brake B3 are engaged. Hence, the gear shift hydraulic pressure data of the second speed to (→) the fourth speed stores data required with low brake B2 released and direct clutch C2 clutched.

Next, the gear shift control for the second speed→the fourth speed during the occurrence of the clutch failure of front brake B1 will be explained. As described above, since the actual gear ratio provides the first speed when the command gear shift stage is the second speed, low brake B2 is clutched and first one-way clutch F1 and second one-way clutch F2 are, furthermore, engaged so that the same states as the clutched states of front brake B1 and H&LR clutch C3 occur.

When low brake B2 is released and direct clutch C2 is clutched on the basis of the gear shift hydraulic pressure data on the second speed to (→) fourth speed, front brake B1, direct clutch C2, and H&LR clutch C3 are in the clutched states. Finally, 2.5 speed is obtained which is not in the clutch table shown in FIG. 2.

At 2.5 speed, front brake B1 is clutched and the rotation of first carrier PC1 is stopped. Therefore, the rotation from input shaft Input to second ring R2 is speed-reduced through first planetary gear GS1. This rotation is outputted from first connection member M1 to fourth ring gear R4. In addition, at 2.5 speed, direct clutch C2 and H&LR clutch C3 are clutched. Thus, second planetary gear G2 is integrally rotated. Consequently, the rotation inputted to fourth ring gear R4 is directly outputted from third carrier C3.

That is to say, as shown in the lever diagram of FIG. 7, the rotation of input shaft Input is speed reduced through first planetary gear set GS1 and is outputted from output shaft Output without speed reduction through second planetary gear set GS2. the rotation speed of output shaft Output is higher than the second speed but is lower than the third speed. Hence, it will be appreciated that the 2.5 speed is the intermediate gear shift stage between the second speed and the third speed.

As described hereinabove, since, during the occurrence in the clutch failure of front brake B1, the gear shift range can be switched to 2.5 speed which is the gear shift stage excluded from the ordinary gear shift stages at the normal operation based on the traveling (running) state of the vehicle, the worsening of the running (driving) performance (or driveablity) can be prevented even during the failure. In addition, when the gear shift stage is switched from first speed to 2.5 speed, the gear shift range hydraulic pressure data used in the gear shift stage from the second speed to the fourth speed can be used. Thus, new gear shift hydraulic pressure data is not needed to be prepared so that the data capacity can be suppressed.

In addition, when the gear shift from the first speed to the second speed is determined on the basis of the shift lines of the shift diagram, the gear shift stage is maintained at the first speed with the execution of the gear shift control using the gear shift hydraulic pressure data of the gear shift used for shifting the gear shift stage from the first speed to the second speed while 2346-brake B3 is forcefully released. Thus, while the gear shift stage that the automatic transmission recognizes is apparently (or deceptively) shifted to the second speed, the actual gear shift stage can be the first speed. Thus, since the gear shift from the first speed to the 2.5 speed can be performed without setting shift line(s) exclusively used during the abnormality state. Consequently, the increase in the data capacity can be suppressed.

Second Embodiment

In this embodiment, the structure of the automatic transmission and clutched and released states of the respective frictional engaging elements for the respective gear shift stages are the same. However, only the control executed in ATCU 20 is different from the first embodiment. Hereinafter, the control executed in the ATCU 20 will be described below with reference to the flowchart of FIG. 8.

Figure 8:
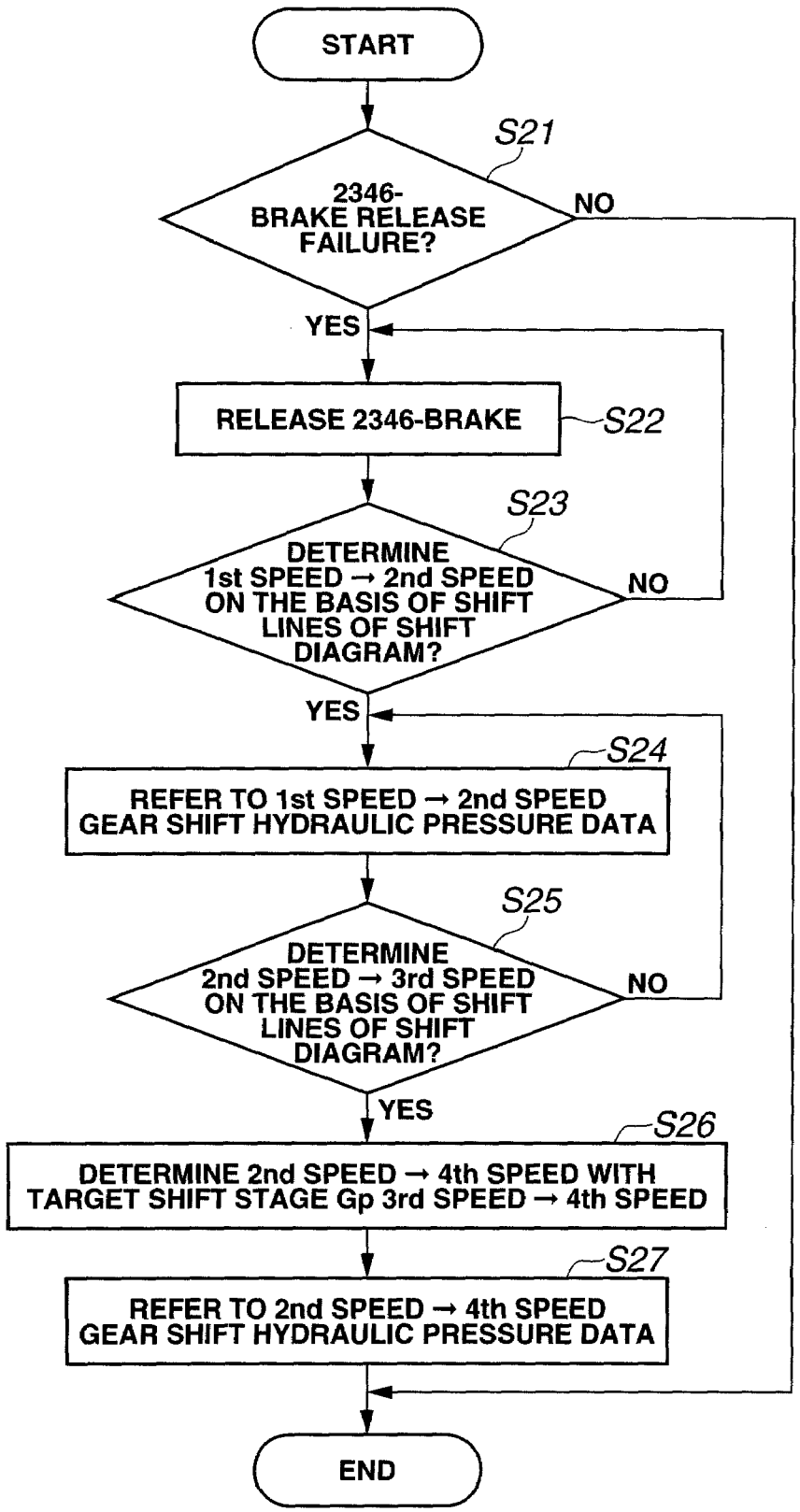
FIG. 8 is a flowchart representing a fail safe control of the automatic transmission in a second preferred embodiment according to the present invention.

That is to say, at a step S21 (failure or abnormality state detecting means (section)), ATCU 20 determines whether 2346-brake B3 fails to be clutched (a release failure occurs). If ATCU 20 determines that 2346-brake B3 fails to be clutched, the routine goes to a step S22. If ATCU 20 determines that 2346-brake B3 does not fail to be clutched (No), the processing of FIG. 8 is ended. It should be noted that the release failure of 2346-brake B3 is a failure such that 2346-brake B3 cannot be clutched with 2346-brake B3 left released (is stuck in the released state for the clutched state to be unachievable). For example, an open-and-closure valve which opens or closes a hydraulic pressure supply passage to 2346-brake B3 is stuck in a valve closure state.

If the determination of whether 2346-brake B3 is stuck in the released state for the clutched state to be unachievable) fails to be released (release failure) is made by the method disclosed in, for example, the Japanese Patent Application Publication No. 2007-120757 described above. That is to say, the interlock has been determined to be developed when the vehicle deceleration in the non-operated state of the foot brake (a brake pedal) is larger than the predetermined deceleration or the gear ratio abnormality is detected from the relationship between the commanded gear shift stage and the actual gear shift stage. If these determinations are made, the actual gear ratio is detected with the commanded gear shift stage at the second speed. If the gear ratio corresponding to the first speed (first gear ratio) is resulted, 2346-brake B3 is determined to fail to be stuck in the released state for the clutched state to be unachievable (left released).

When 2346-brake B3 is determined to fail to be clutched (namely, to be stuck in the released state for the clutched state to be unachievable), 2346-brake B3 is always in the release state irrespective of the commanded gear shift stage. Hence, any one or more of the gear shift stages that can normally gear shifted are only the first (1st) speed, the fifth (5th) speed, the seventh (7th) speed, and the reverse speed (gear ratio) as appreciated from FIG. 2. At this time, the driveability is remarkably worsened since the difference between the gear ratios of the first speed and the fifth speed is too large to execute the gear shift and it is necessary to prepare the gear shift hydraulic pressure date from the first speed to the fifth speed. Consequently, the data capacity is augmented.

The gear shift method achievable to the intermediate gear shift stage used only in case of emergency (in the case of the abnormality state) using the ordinary gear shift hydraulic pressure data will be explained below.

At a step S22, ATCU 20 forcefully releases 2346-brake B3. In a case where 2346-brake B3 fails to be released, 2346-brake B3 is in the released state even if not forcefully released. However, in this control, 2346-brake B3 is presumed to be forcefully in the released state.

The series of controls carried out at steps S23 through S27 are the same as those described in the first embodiment. Thus, even during the release failure of 2346-brake B3, the gear shift control is executed using the gear shift hydraulic pressure data from the second speed to (→) the fourth speed in the same way as the first embodiment in order for the actual gear shift stage from the first speed to the 2.5 speed which is intermediate between the third speed and the second speed.

As described hereinabove, during the release failure of 2346-brake B3, the gear shift stage can be switched to the 2.5 speed which is not included in the ordinary shift stages based on the traveling state of the vehicle. Hence, even if the failure occurs in 2346-brake B3, the worsening of the driving performance (driveability) can be prevented. In addition, when the gear shift from the first speed to the 2.5 speed is carried out, the gear shift hydraulic pressure data is used using the gear shift from the second speed to the fourth speed. Hence, it is not necessary to prepare new gear shift hydraulic pressure data during the occurrence in the release failure in 2346-brake B3. The augmentation of the data capacity can be suppressed.

The present invention is not limited to the preferred embodiments and various changes and modifications can be made without departing from the scope of the present invention. For example, in each of the first and second embodiments, an up-shift of the gear ratio (gear shift stage) from the first speed to the 2.5 speed in accordance with the shift command of the gear shift stage from the second speed to (→) the fourth speed has been explained. A down-shift from the 2.5 speed to the first speed in accordance with the gear shift command from the fourth speed to the second speed may be carried out.

It should be noted that the above-described embodiment is described in order to facilitate a better understanding of the present invention and do not limit the scope of the present invention. Hence, each essential element disclosed in the above-described embodiment includes all design modifications and equivalents belonging to the scope of the present invention. This application is based on a prior Japanese Patent Application No. 2006-342597. The entire contents of a Japanese Patent Application No. 2006-342597 with a filing date of Dec. 20, 2006 are hereby incorporated by reference. Although the invention has been described above by reference to certain embodiments of the invention, the invention is not limited to the embodiment described above. Modifications and variations of the embodiments described above will occur to those skilled in the art in light of the above teachings. The scope of the invention is defined with reference to the following claims.

What is claimed is:

1. An automatic transmission, comprising:
a plurality of planetary gears;
a plurality of frictional engaging elements connected to rotational elements of the respective planetary gears, the automatic transmission achieving a plurality of gear shift stages based on a traveling state of a vehicle by changing clutched and released states of the respective frictional engaging elements and the plurality of gear shift stages including a third gear shift stage achieved by releasing a first frictional engaging element, the first frictional engaging element being clutched at a first gear shift stage and at a second gear shift and the automatic transmission achieving another gear shift stage of a fourth gear shift stage not based on the traveling state of the vehicle but achieved by releasing the first frictional engaging element clutched at the second gear shift stage;
a first shift control section configured to perform a gear shift control to shift the gear shift stage between the first gear shift stage and the second gear shift stage by referring to a first gear shift control data used when the gear shift stage is switched between the first gear shift stage and the second gear shift stage;
an abnormality state detecting section configured to detect an abnormality state in which both of the first gear shift stage and the second gear shift stage are unachieved due to a failure of at least one of the first frictional engaging element and a second frictional engaging element which is released at both of the first gear shift stage and the second gear shift stage; and
an abnormality state gear shift control section configured to perform the gear shift control to shift the gear shift stage between the third gear shift stage and the fourth gear shift stage through the first gear shift control section, while forcefully releasing the first frictional engaging element, when the abnormality state detecting section detects the abnormality state.

2. The automatic transmission as claimed in claim 1, wherein the automatic transmission further comprises: a first determining section configured to determine whether the gear shift between the third gear shift stage and the first gear shift stage occurs; a second gear shift control section configured to perform a second gear shift control between the third gear shift stage and the first gear shift stage by referring to a second gear shift control data used when the gear shift between the third speed gear shift stage and the first gear shift stage occurs; and a second abnormality state gear shift control section configured to perform the gear shift control through the second gear shift control section to maintain an actual gear shift stage at the third gear shift stage, while forcefully releasing the first frictional engaging element, when the abnormality state detecting section detects the abnormality state and when the first determining section determines that the gear shift between the third gear shift stage and the first gear shift stage occurs.

3. The automatic transmission as claimed in claim 1, wherein the abnormality state detecting section is configured to detect the abnormality state depending upon whether the second frictional engaging element is in an abnormal state to be stuck in the clutched state for the released state to be unachievable.

4. The automatic transmission as claimed in claim 1, wherein the abnormality detecting section is configured to detect the abnormality state depending upon whether the first frictional engaging element is stuck in the released state for the clutched state to be unachievable.

5. The automatic transmission as claimed in claim 2, wherein the planetary gears include first and second planetary gear sets, each planetary gear set having two planetary gears, an input shaft (Input) of the planetary gears being connected to an engine via a torque converter and to a second ring gear of a second planetary gear, an output shaft being connected to a third pinion-carrier of a third planetary gear and to each drive wheel of the vehicle, the frictional engaging elements within a transmission case includes an input clutch configured to selectively connect and disconnect between the input shaft and a second connection member connected between a third ring gear of a third planetary gear and a fourth carrier of a fourth planetary gear, a direct clutch configured to selectively connect and disconnect between a fourth sun gear of the fourth planetary gear and a fourth carrier of the fourth planetary gear, an H&LR clutch configured to selectively connect and disconnect between a third sun gear of the third planetary gear and the fourth sun gear of the fourth planetary gear, a front brake configured to selectively stop a rotation of a first carrier of a first planetary gear, a low brake configured to selectively stop a rotation of the third sun gear of the third planetary gear, a 2346-brake configured to selectively stop a rotation of a third connection member connected between a first sun gear of the first planetary gear and a second sun gear of a second planetary gear, and a reverse brake configured to selectively stop a rotation of a fourth carrier of the fourth planetary gear, at a first speed, only the low brake is clutched, first and second one-way clutches are engaged, and, during an action of an engine braking, the front brake and the H&LR clutch are, furthermore, clutched, at a second speed, the low brake and the 2346-brake are clutched and the first one-way clutch is engaged, at a third speed, the low brake, 2346-brake, and direct clutch are clutched, at a fourth speed, the 2346-brake, direct clutch, and clutch are clutched, at a fifth speed, the input clutch, direct clutch, and the clutch are clutched, at a sixth speed, the input clutch, the H&LR clutch, and 2346-brake are clutched, and, at a seventh speed, the input clutch, H&LR clutch, and the front brake are clutched and the first one-way clutch is engaged, and at a reverse speed, the clutch, the front brake, and the reverse brake are clutched.

6. The automatic transmission as claimed in claim 5, wherein the abnormality state detecting section detects whether the front brake is stuck in the clutched state for the released state to be unachievable to determine whether the abnormality state in which both of the first gear shift stage and the second gear shift stage are unachieved occurs and the second abnormality state gear shift control section forcefully releases the 2346-brake to shift the gear shift stage to the first speed when the abnormality state detecting section detects that the front brake is stuck in the clutched state for the released state to be unachievable, determines whether it is necessary to perform the gear shift between the first speed and the second speed on the basis of the traveling state of the vehicle, and performs the gear shift control through the second gear shift control section by referring to the second gear shift control data representing a gear shift hydraulic pressure data between the first speed and the second speed, an actual gear shift stage being maintained at the first speed.

7. The automatic transmission as claimed in claim 6, wherein the automatic transmission further comprises a second determining section configured to determine whether it is necessary to perform the gear shift between the second speed and the third speed on the basis of the traveling state of the vehicle and a third determining section configured to determine whether it is necessary to perform the gear shift between the second speed and the fourth speed on the basis of the traveling state of the vehicle when the second determining section determines that it is necessary to perform the gear shift between the second speed and the third speed.

8. The automatic transmission as claimed in claim 7, wherein the first abnormality state gear shift control section performs the gear shift control between the second speed and the fourth speed through the first gear shift control section by referring to the first gear shift control date representing a hydraulic pressure data of the gear shift between the second speed and the fourth speed, the automatic transmission recognizing that the gear shift is controlled on the basis of the gear shift hydraulic pressure data between the second speed and the fourth speed but actually the gear shift is controlled to shift the gear shift stage between the first speed and a 2.5 speed which is intermediate between the third speed and the second speed.

9. The automatic transmission as claimed in claim 8, wherein, at the 2.5 speed, the front brake or the first one-way clutch, the direct clutch, and the H&LR clutch are clutched with the low brake released.

10. The automatic transmission as claimed in claim 5, wherein the abnormality state detecting section detects whether the 2346-brake is stuck in the released state for the clutched state to be unachievable to determine whether the abnormality state in which both of the first gear shift stage and the second gear shift stage are unachieved occurs and the second abnormality state gear shift control section forcefully releases the 2346-brake to shift the gear shift stage to the first speed when the abnormality state detecting section detects that the 2346-brake is stuck in the released state for the clutched state to be unachievable, determines whether it is necessary to perform the gear shift between the first speed and the second speed on the basis of the traveling state of the vehicle, and performs the gear shift control through the second gear shift control section by referring to the second gear shift control data representing a gear shift hydraulic pressure data between the first speed and the second speed, an actual gear shift stage being maintained at the first speed.

11. The automatic transmission as claimed in claim 7, wherein the first, second, and third determining section determines whether it is necessary to change the gear shift stage on the basis of a plurality of shift lines predetermined according to a quantity of operation of an accelerator and a vehicle speed.

12. The automatic transmission as claimed in claim 5, wherein the third gear shift stage corresponds to the first speed, the second gear shift stage corresponds to the fourth speed, the first gear shift stage corresponds to the second speed, the fourth gear shift stage corresponds to an intermediate gear shift stage between the second gear shift stage and the first gear shift stage, the first frictional engaging element corresponds to the 2346-brake, and the second frictional engaging element corresponds to the front brake.

13. The automatic transmission as claimed in claim 12, wherein the fourth gear shift stage corresponds to a 2.5 speed between the third speed and the second speed.

14. A control method applicable to an automatic transmission, the automatic transmission comprising:
providing a plurality of planetary gears; and
providing a plurality of frictional engaging elements connected to rotational elements of the respective planetary gears, the automatic transmission achieving a plurality of gear shift stages based on a traveling state of a vehicle by changing clutched and released states of the respective frictional engaging elements and the plurality of gear shift stages including a third gear shift stage achieved by releasing a first frictional engaging element, the first frictional engaging element being clutched at a first gear shift stage and at a second gear shift stage and the automatic transmission achieving another gear shift stage of a fourth gear shift stage not based on the traveling state of the vehicle but achieved by releasing the first frictional engaging element clutched at the second gear shift stage, the control method comprising:
performing a gear shift control to shift the gear shift stage between the first gear shift stage and the second gear shift stage by referring to a first gear shift control data used when the gear shift stage is switched between the first gear shift stage and the second gear shift stage;
detecting an abnormality state in which both of the first gear shift stage and the second gear shift stage are unachieved due to a failure of at least one of the first frictional engaging element and a second frictional engaging element which is released at both of the first gear shift stage and the second gear shift stage; and
performing the gear shift control to shift the gear shift stage between the third gear shift stage and the fourth gear shift stage by performing the gear shift control to shift the gear shift stage between the first gear shift stage and the second gear shift stage, while forcefully releasing the first frictional engaging element, when detecting the abnormality state.

* * * * *